(12) United States Patent
Hoshino (10) Patent No.: US 12,308,174 B2
(45) Date of Patent: May 20, 2025

(54) ELECTRONIC COMPONENT

(71) Applicant: Murata Manufacturing Co., Ltd., Nagaokakyo (JP)

(72) Inventor: Yuuta Hoshino, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 164 days.

(21) Appl. No.: 18/362,132

(22) Filed: Jul. 31, 2023

(65) Prior Publication Data

US 2024/0029957 A1 Jan. 25, 2024

Related U.S. Application Data

(63) Continuation of application No. PCT/JP2022/007004, filed on Feb. 21, 2022.

(30) Foreign Application Priority Data

Mar. 26, 2021 (JP) .................. 2021-054078

(51) Int. Cl.
*H01G 4/224* (2006.01)
*H01G 4/30* (2006.01)

(52) U.S. Cl.
CPC ............... *H01G 4/224* (2013.01); *H01G 4/30* (2013.01)

(58) Field of Classification Search
CPC .................. H01G 4/224; H01G 4/30
See application file for complete search history.

(56) References Cited

U.S. PATENT DOCUMENTS

| | | | |
|---|---|---|---|
| 2014/0292141 A1 | 10/2014 | Nishisaka et al. | |
| 2014/0376155 A1* | 12/2014 | Omori | H01G 4/30 361/301.4 |
| 2015/0223340 A1* | 8/2015 | Jung | H01G 4/008 156/89.12 |
| 2015/0287532 A1* | 10/2015 | Abe | H05K 3/3436 427/79 |
| 2016/0027585 A1* | 1/2016 | Inoue | H01G 4/1209 29/25.42 |
| 2016/0343506 A1* | 11/2016 | Lee | H01G 4/232 |
| 2018/0122993 A1* | 5/2018 | Camras | C23C 16/45525 |

FOREIGN PATENT DOCUMENTS

| | | |
|---|---|---|
| JP | H03280404 A | 12/1991 |
| JP | H04266006 A | 9/1992 |
| JP | H06244008 A | 9/1994 |
| JP | H08236306 A | 9/1996 |
| JP | H09162016 A | 6/1997 |
| JP | 2005005412 A | 1/2005 |
| JP | 2013197509 A | 9/2013 |
| JP | 2014209551 A | 11/2014 |
| WO | 2013140903 A1 | 9/2013 |

OTHER PUBLICATIONS

International Search Report in PCT/JP2022/007004, mailed May 10, 2022, 3 pages.

* cited by examiner

*Primary Examiner* — Michael P McFadden
(74) *Attorney, Agent, or Firm* — ArentFox Schiff LLP (57) ABSTRACT

An electronic component that includes: a ceramic body; an external electrode on a first part of a surface of the ceramic body; and a glass layer covering at least a second part of the surface of the ceramic body, wherein the glass layer contains silicon atoms, titanium atoms, and zirconium atoms, and the glass layer has a titanium dispersion proportion of 90% or more and a zirconium dispersion proportion of 60% or more.

7 Claims, 4 Drawing Sheets

ELECTRONIC COMPONENT

CROSS REFERENCE TO RELATED APPLICATIONS

The present application is a continuation of International application No. PCT/JP2022/007004, filed Feb. 21, 2022, which claims priority to Japanese Patent Application No. 2021-054078, filed Mar. 26, 2021, the entire contents of each of which are incorporated herein by reference.

TECHNICAL FIELD

The present invention relates to an electronic component, and more particularly to an electronic component including a ceramic body and a glass layer covering a part of a surface of the ceramic body.

BACKGROUND ART

An electronic component including a ceramic body can include external electrodes for mounting on a circuit board or the like on both sides of the ceramic body. For example, in Patent Document 1, terminal electrodes are provided at both ends of a ceramic body (thermistor chip), and a metal plating layer is formed on a surface of the terminal electrodes by electrolytic plating. In order to prevent a plating film from being formed on the side surfaces of the ceramic body during electrolytic plating, the side surfaces of the ceramic body are covered with a high-resistance layer such as a glass layer.

Patent Document 1: Japanese Patent Application Laid-Open No. H8-236306

SUMMARY OF THE INVENTION

In Patent Document 1, since electrolytic plating is performed after the glass layer is formed on the side surfaces of the ceramic body, the glass layer comes into contact with a plating solution.

However, glass may have low resistance to a plating solution, and the glass layer may be peeled off from the ceramic body during the plating step. When the glass layer is peeled off, a plating film can be formed on the side surface of the ceramic body, and therefore it is required to suppress peeling of the glass layer.

Therefore, an object of the present invention is to provide an electronic component including a glass layer resistant to a plating solution.

One gist of the present invention provides an electronic component including a ceramic body; an external electrode on a first part of a surface of the ceramic body; and a glass layer covering at least a second part of the surface of the ceramic body, wherein the glass layer contains silicon atoms, titanium atoms, and zirconium atoms, and the glass layer has a titanium dispersion proportion of 90% or more and a zirconium dispersion proportion of 60% or more.

According to the present invention, since a glass layer resistant to a plating solution is formed, there is provided an electronic component capable of suppressing peeling of the glass layer during electrolytic plating.

DETAILED DESCRIPTION OF THE INVENTION

An electronic component of an embodiment includes a ceramic body; an external electrode on a first part of a surface of the ceramic body; and a glass layer covering at least a second part of the surface of the ceramic body, wherein the glass layer contains silicon atoms, titanium atoms, and zirconium atoms, and the glass layer has a titanium dispersion proportion of 90% or more and a zirconium dispersion proportion of 60% or more.

As a result of intensive studies, the inventors have newly defined concepts of a "titanium dispersion proportion" and a "zirconium dispersion proportion" as indices indicating characteristics of a glass layer and have newly found that these concepts have a correlation with plating solution resistance of the glass layer, thereby completing the present invention.

An electronic component according to the present invention will be described below.

As long as the electronic component includes a ceramic body, and an external electrode and a glass layer on the surface of the ceramic body, the shape, dimensions, and material of the ceramic body, and the number, arrangement, shape, and the like of the external electrode are not particularly limited. The ceramic body may or may not have an internal electrode buried therein, and if present, the internal electrode is electrically connected to the external electrode in an appropriate manner.

The electronic component usable in the present embodiment may be, for example, a surface mounting type, particularly, a chip component, and more specifically, may be a capacitor such as a multilayer ceramic capacitor, an inductor (coil) such as a wound inductor, a film inductor, and a multilayer inductor, a resistor such as a chip resistor, a transistor, an LC composite component, or the like.

Figure 1:
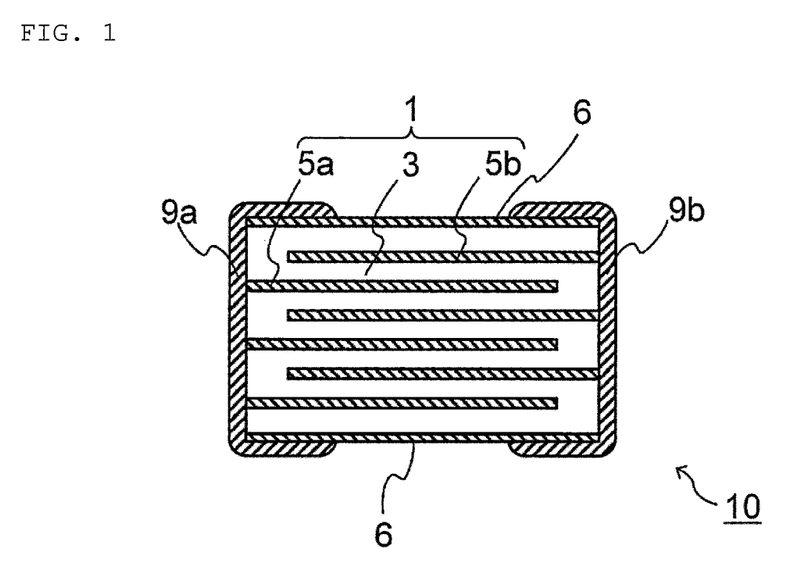
FIG. 1 is a schematic sectional view schematically illustrating an exemplary electronic component according to an embodiment of the present invention.

Exemplarily, an electronic component 10 of the present embodiment can be a multilayer ceramic capacitor as illustrated in FIG. 1 and includes a ceramic body 1 including a ceramic portion 3 made of a ceramic material and internal electrodes 5a and 5b opposed to each other with the ceramic portion 3 interposed therebetween, and external electrodes 9a and 9b provided on surfaces of the ceramic body 1 and electrically connected to the internal electrodes 5a and 5b, respectively. More specifically, the internal electrodes 5a and 5b are embedded in the ceramic body 1, stacked so as to be alternately exposed from opposing end surfaces of the ceramic body 1, and electrically connected to the external electrodes 9a and 9b, respectively. However, the electronic component 10 of the present embodiment is not limited to the one illustrated in FIG. 1 but may be various electronic components as described above.

As shown in FIG. 1, the electronic component 10 of the present embodiment includes a glass layer 6 in contact with a surface of the ceramic body 1. The glass layer 6 covers at least a part of the surface of the ceramic body 1. The glass layer 6 preferably covers at least a part of the surface of the ceramic body 1 on which the external electrodes 9a and 9b are not provided, more preferably covers the whole surface. Further, as shown in FIG. 1, a part of the glass layer 6 may also be provided on the surface of the ceramic body 1 covered with the external electrodes 9a and 9b.

Since the glass layer 6 has an insulating property, the glass layer 6 is formed at such a position as to avoid the internal electrodes 5a and 5b. In the case of an electronic component without internal electrodes (such as a wound inductor), the glass layer 6 may be formed on the whole surface of the ceramic body 1.

As a modification of the glass layer of the present invention containing Ti and Zr, a glass layer imparted with conductivity by containing a metal may be used. The conductive glass layer can also be provided on the internal electrodes 5a and 5b.

The specific resistance of the conductive glass layer is desirably less than $1.0 \times 10^{-2}$ Ω·cm in order to ensure conduction with the internal electrodes.

When the glass layer 6 is configured as described above, the surface of the ceramic body 1 not covered with the external electrodes 9a and 9b can be protected when a plating layer is formed.

The glass layer 6 contains titanium atoms and zirconium atoms. The content and dispersion state thereof can be understood in terms of a "titanium dispersion proportion" and a "zirconium dispersion proportion".

The "titanium dispersion proportion" corresponds to an area ratio of a region where it is determined that the titanium (Ti) element is present in a section of the glass layer. Similarly, the "zirconium dispersion proportion" corresponds to an area ratio of a region where it is determined that the zirconium (Zr) element is present in a section of the glass layer.

For example, when it is determined that the titanium element is present in the whole observation range (100% of the area of the observation range) of the section, the titanium dispersion proportion is 100%.

For example, when it is determined that the zirconium element is present in 80% of the area of the observation range of the section, the zirconium dispersion proportion is 80%.

The mechanism by which the plating solution resistance of the glass layer 6 can be improved when the titanium dispersion proportion and the zirconia dispersion proportion in the glass layer 6 are high is not clear, but is presumed as follows.

First, when the glass layer 6 comes into contact with the plating solution, the surface of the glass layer 6 is dissolved to reduce the thickness. When the pH of the plating solution is alkaline, the network structure of the glass layer may be destroyed. In addition, it is considered that the components contained in the plating solution and the stability constant of a metal oxide constituting the glass layer 6 have effects, and when the stability constant is high, the metal oxide constituting the glass layer 6 may be dissolved. As the glass layer 6 is gradually dissolved, bonding between the glass layer 6 and the ceramic body 1 becomes fragile, and peeling between the glass layer 6 and the ceramic body 1 progresses.

In the present embodiment, since the glass layer 6 is formed using the sol-gel method, it is presumed that not only oxides such as $SiO_2$, $TiO_2$, and $ZrO_2$ exist alone, but also a network such as Si—O—Ti and Si—O—Zr is formed in the glass layer 6. $TiO_2$ and $ZrO_2$ have high chemical stability and are further firmly bonded as Si—O—Ti and Si—O—Zr, and if the glass layer 6 contains a large amount of Ti and Zr (that is, the titanium dispersion proportion and the zirconia dispersion proportion are high), dissolution of the glass layer 6 is suppressed to improve the plating solution resistance. In addition, it is also conceivable that $Ti^{4+}$ and $Zr^{4+}$ having a larger ionic radius than $Si^{4+}$ ions and a larger bonding strength with oxygen ions enter the space of the network structure.

In the present invention, when the glass layer has a titanium dispersion proportion of 90% or more and a zirconium dispersion proportion of 60% or more, a glass layer excellent in plating resistance can be obtained.

The titanium dispersion proportion is preferably 95% or more, more preferably 99%, still more preferably 99.9%, and the upper limit is 100%.

The zirconium dispersion proportion is preferably 75% or more, more preferably 78%, still more preferably 99.9%, and the upper limit is 100%.

When both the titanium dispersion proportion and the zirconium dispersion proportion are at high levels such as a titanium dispersion proportion of 90% or more and a zirconium dispersion proportion of 60% or more, the plating solution resistance characteristics of the glass layer 6 can be significantly improved. However, since both titanium and zirconium improve plating solution resistance by the same action, also when the glass layer 6 satisfies only one of a titanium dispersion proportion of 90% or more and a zirconium dispersion proportion of 60% or more, plating solution resistance can be improved as compared with a conventional glass layer.

The "titanium dispersion proportion" and the "zirconium dispersion proportion" are determined by the following steps 1) to 7) using the intensity data of the EDX image.

First, the "titanium dispersion proportion" will be described as an example.

1) A section of the glass layer 6 is observed at a magnification of about 200,000 times by TEM-EDX, and a TEM image and an EDX mapping image of Ti are acquired for the same observation region. At this time, it is preferable to perform the acquisition such that the interface between the glass layer 6 and the ceramic body 1 is horizontal on the screen (see FIG. 2). The interface may be slightly inclined (see FIG. 3), and for example, it is sufficient that the inclination angle (angle formed by the horizontal direction and the interface on the screen) is within 20°. When the inclination angle exceeds 20°, correction is performed by image processing so that the inclination angle will be 20° or less, or the image is changed to an image of another portion of the glass layer 6.

2) Intensity data is extracted as a CVS file from an EDX image of Ti using a TEM-EDX apparatus (FE-TEM/EDX (JEOL JEM-F200 (manufactured by JEOL Ltd.)/analysis system Noran system 7 (manufactured by Thermo Fisher Scientific))). The numerical data included in the CVS file is numerical data in a matrix form. As an example, numerical data in a matrix form of 256 rows×256 columns can be exemplified. These pieces of numerical data correspond to the intensities in the respective small sections obtained by dividing the TEM image and the EDX image into 256 pieces in the longitudinal direction and 256 pieces in the lateral direction. When the numerical data in a matrix form is output, for example, in the form of spreadsheet software, processing in the subsequent procedure is easy.

3) The numerical data of the CVS file is standardized. A maximum value (Vmax) of numerical data included in the CVS file is determined, and a coefficient (100/Vmax) using the maximum value is determined.

4) All the pieces of numerical data of the CVS file are multiplied by the determined coefficient. As a result, all numerical data can be standardized such that the maximum value of the numerical data is 100.

Figure 2:
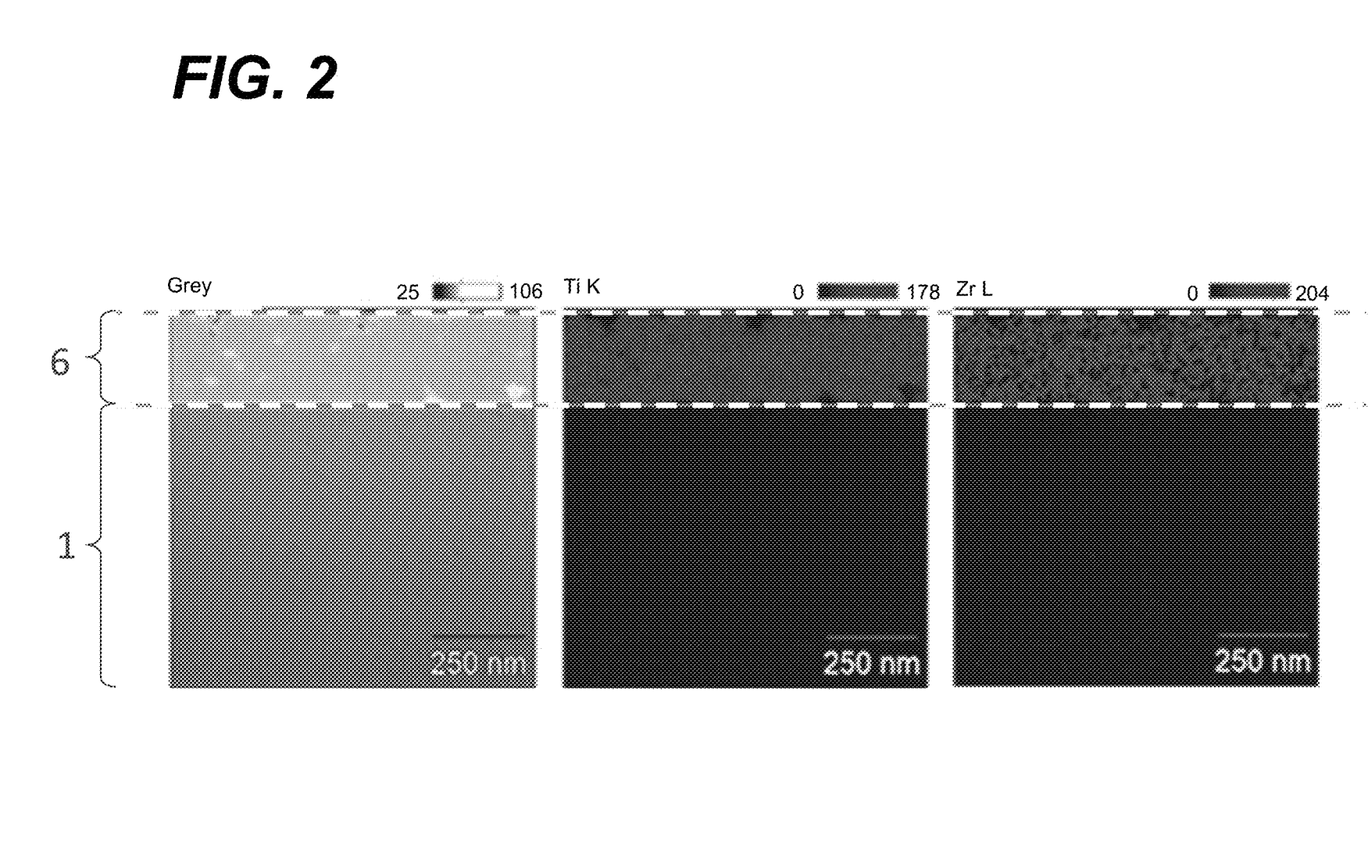
FIG. 2 shows a TEM image of a sectional view of a glass layer and a result of examining distributions of Ti and Zr from the TEM image by EDX analysis in the embodiment of the present invention.

5) The range of the glass layer 6 is determined on the basis of the TEM image. In FIG. 2, a horizontal line (lower broken line) passing through the interface between the glass layer 6 and the ceramic body 1 and a horizontal line (upper broken line) passing through the interface between the glass layer 6 and a protective film for cutting the sample are drawn, and a region sandwiched between the two broken lines is defined as a "measurement target region". The "measurement target region" is always rectangular (elongated rectangular or square).

Figure 3:
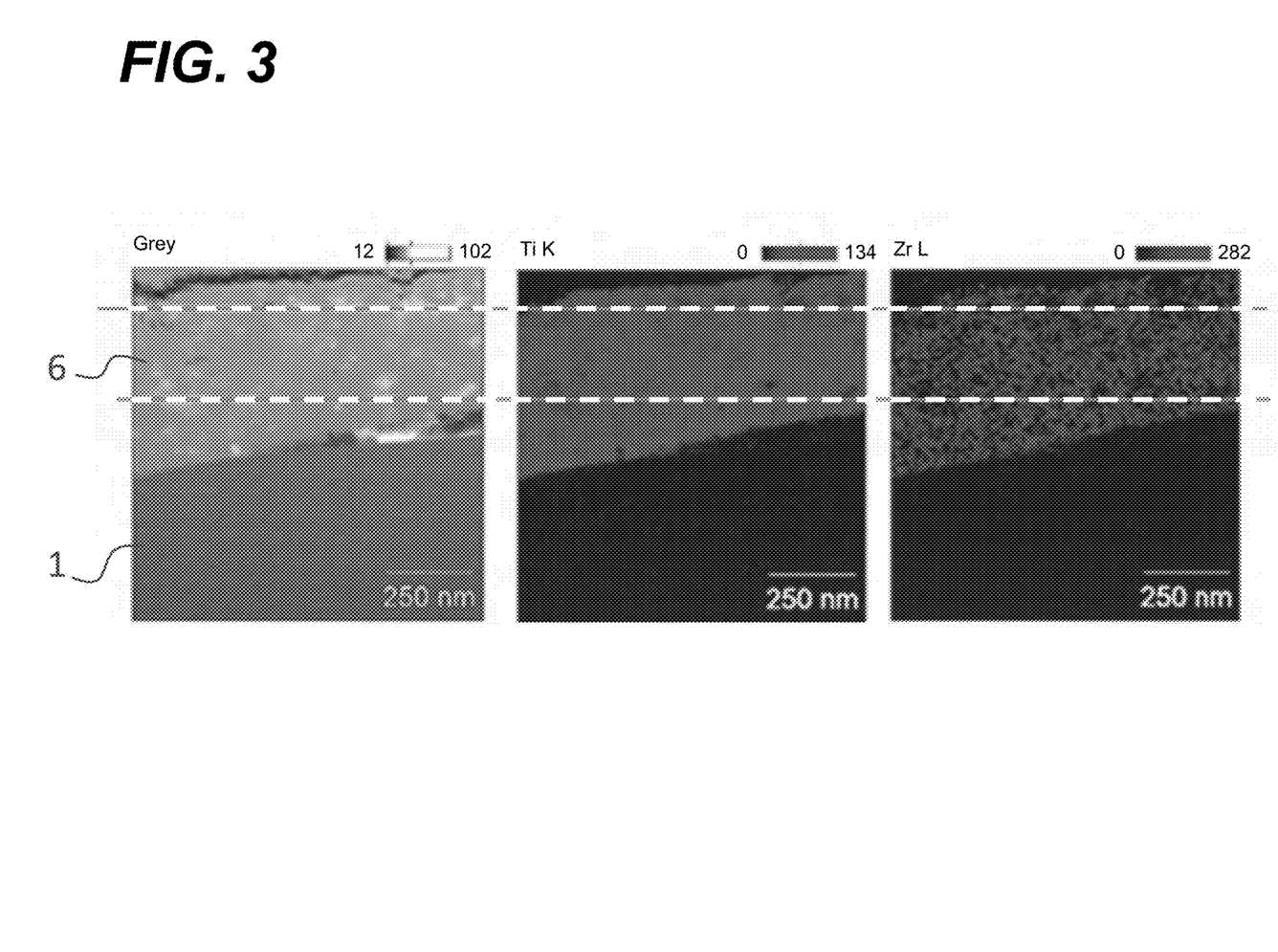
FIG. 3 shows a TEM image of a sectional view of a glass layer and a result of examining distributions of Ti and Zr from the TEM image by EDX analysis in the embodiment of the present invention.

When the interfaces are inclined from the horizontal direction as shown in FIG. 3, the lower broken line is drawn horizontally so as to pass through the highest position of the interface between the glass layer 6 and the ceramic body 1, and the upper broken line is drawn horizontally so as to pass through the lowest position of the interface between the glass layer 6 and the protective film. When the broken lines are drawn in this manner, only the glass layer 6 is included in the "measurement target region" sandwiched between the two broken lines.

6) The EDX image of Ti is arranged next to the TEM image, and the upper and lower broken lines are extended to the EDX image (FIG. 2). Positions (positions of four corners of the glass layer 6) at which the broken lines intersect the left and right edges of each EDX image are specified on the matrix data in each CVS file. For example, the position of the lower right corner can be regarded as a position that is in the rightmost column of the numerical data in a matrix form and at which the numerical value becomes a significant value (for example, the numerical value is 10 or more) when a change in the numerical value is checked from the bottom to the top. Numerical data in a range surrounded by the "four corners" specified on the numerical data in a matrix form corresponds to intensity data included in the "measurement target region" sandwiched between the two broken lines in the EDX image. Note that, instead of specifying all the positions of the four corners on the numerical data in a matrix form, the positions of two diagonal corner portions are specified, and the numerical data surrounded by a rectangular range having the two corner portions corresponds to the intensity data included in the "measurement target region" specified using the EDX image.

When the interface of the glass layer 6 is inclined as shown in FIG. 3, attention is paid to two corner portions adjacent to the interface between the glass layer 6 and another layer (the ceramic body 1 or the protective film) among four positions where the broken lines intersect the left and right edge portions of each EDX image. In FIG. 3, those positions are two corners: an upper left corner portion near the interface between the glass layer 6 and the protective film; and a lower right corner portion near the interface between the glass layer 6 and the ceramic body 1, and these two corner portions are on a diagonal line of the rectangular "measurement target region". The positions of the two corner portions are specified on the numerical data in a matrix form in the CVS file by the above-described method. The numerical data surrounded by the rectangular range having the two corner portions corresponds to the intensity data included in the "measurement target region" specified on the EDX image.

It is to be noted that voids may be formed at the interface between the glass layer 6 and the ceramic body 1 or the interface between the glass layer 6 and the protective film. When a void is located at any of the four corners, two corners are determined with the surface of the glass layer 6 facing the void being regarded as the "interface". In this manner, the "measurement target region" can be clearly defined.

7) The total number (referred to as "Ntitotal") of pieces of the numerical data within the rectangular range specified as corresponding to the "measurement target region" on the numerical data in a matrix form and the number (referred to as "Nti20") of pieces of numerical data of 20 or more within the rectangular range are counted.

8) Ntitotal and Nti20 are substituted into Equation (1) below to determine the "titanium dispersion proportion".

$$\text{Titanium dispersion proportion (\%)} = N_{ti20}/N_{titotal} \times 100 \quad (1)$$

Regarding the zirconium dispersion proportion, the TEM image and the EDX mapping image of Zr of the section of the glass layer 6 are acquired, and the total number (referred to as "Nzrtotal") of pieces of the numerical data within the rectangular range specified as corresponding to the "measurement target region" on the numerical data in a matrix form and the number (referred to as "Nzr20") of pieces of the numerical data of 20 or more within the rectangular range are counted by the same procedure, and the numbers are substituted into Equation (2) below to determine the "zirconium dispersion proportion".

$$\text{Zirconium dispersion proportion (\%)} = N_{zr20}/N_{zrtotal} \times 100 \quad (2)$$

A titanium dispersion proportion of 100% means that Nti20=Ntitotal. That is, it means that titanium was observed in the whole "measurement target region" defined on the EDX image of Ti. In such a case, it can also be considered that titanium is uniformly dispersed in the "measurement target region". As described above, when the titanium dispersion proportion is high, it can be presumed that titanium is relatively uniformly dispersed in the "measurement target region".

Similarly, when the zirconium dispersion proportion is high, it can be presumed that zirconium is relatively uniformly dispersed in the "measurement target region".

In addition, in order to improve the titanium dispersion proportion and the zirconium dispersion proportion, it is desirable that the void ratio of the glass layer 6 be low. When a void is present, titanium and zirconium cannot be present in that portion. Therefore, when a void exists in the "measurement target region", the value of Nti20 and the value of Nzr20 decrease, and the titanium dispersion proportion and the zirconium dispersion proportion decrease. Therefore, the glass layer 6 is preferably dense.

The glass layer 6 is preferably 0.01 μm to 2 μm in thickness. Such a thin glass layer 6 can be formed by using, for example, the sol-gel method.

The external electrodes 9 can each include a base electrode layer and a plating layer disposed on the base electrode layer. The base electrode layer can include at least one of a baked layer, a resin layer, and a thin film layer. The base electrode layer is preferably 10 μm to 50 μm in thickness.

The baked layer includes glass and a metal. The metal material constituting the baked layer is one metal selected from the group consisting of Ni, Cu, Ag, Pd, and Au, or an alloy containing the metal, and for example, an alloy of Ag and Pd can be used. The glass contains Si and Zn. The baked layer may be formed of a plurality of laminated layers. The baked layer may be a layer obtained by applying a conductive paste to the ceramic body and baking the paste, or a layer subjected to co-firing with the internal electrodes 5a and 5b.

The resin layer includes conductive particles and a thermosetting resin. When the resin layer is provided, the resin layer may be provided directly on the ceramic body without providing any baked layer. The resin layer may be formed of a plurality of laminated layers. The maximum thickness of the resin layer is preferably 5 µm to 20 µm.

The thin film layer is formed by a thin-film formation method such as a sputtering method and a vapor deposition method. The thin film layer is a layer of 1 µm or less formed by deposition of metal particles.

The material constituting the plating layer is composed of one metal selected from the group consisting of Ni, Cu, Ag, Pd, and Au, or an alloy containing the metal, and for example, an alloy of Ag and Pd can be used.

The plating layer may be formed of a plurality of laminated layers. In this case, preferably the plating layer has a two-layer structure in which the Sn plating layer is formed on the Ni plating layer. The Ni plating layer has the function of preventing the base electrode layer from being eroded by solder for mounting the electronic component. The Sn plating layer has the function of improving the wettability to the solder for mounting the electronic component, thereby making it easy to mount the electronic component.

The average thickness of the Ni plating layer is preferably 0.5 µm to 10 µm. The average thickness of the Sn plating layer is preferably 0.5 µm to 10 µm.

[Manufacturing Method]

The electronic component 10 of the present embodiment can be manufactured by, for example, the following method.

1) Preparation of Ceramic Body 1

First, the ceramic body 1 is prepared. The ceramic body 1 can be prepared by any suitable method.

For example, the ceramic material constituting the ceramic body 1 (more specifically, the ceramic portion 3) is not particularly limited as long as it is a ceramic material used for electronic components. Since the electronic component 10 exemplarily illustrated in FIG. 1 is a multilayer capacitor, the ceramic material is a dielectric material, and examples thereof include $BaTiO_3$, $CaTiO_3$, $SrTiO_3$, $CaZrO_3$, $(BaSr)TiO_2$, $Ba(ZrTi)O_2$, and $(BiZn)Nb_2O_7$. When present, the material constituting the internal electrodes 5a and 5b is not particularly limited as long as it is conductive, and examples thereof include Ag, Cu, Pt, Ni, Al, Pd, and Au. The material constituting the internal electrodes 5a and 5b is preferably Ag, Cu, and Ni.

The ceramic material used in the present embodiment is not limited to the above-described materials but can be appropriately selected according to the type, configuration, and the like of the electronic component. For example, when the electronic component is a ferrite coil component, the ceramic material may be a ferrite material containing Fe, Ni, Zn, Mn, Cu, or the like. In this case, the ceramic body may include a coil instead of the internal electrodes. As long as the coil is finally electrically connected to the external electrodes, for example, the coil may be embedded in the ceramic body in advance or wound around the ceramic body before or after the external electrodes are formed.

2) Formation of Glass Layer 6

Next, the glass layer 6 is formed in a region of the surface of the ceramic body 1 excluding the internal electrodes 5a and 5b.

In the present embodiment, the glass layer 6 can be formed by the thin film production method using a solution. As the thin film production method, the sol-gel method, the metal-organic decomposition (MOD) method, the chemical solution deposition (CSD) method, or the like can be used. Note that these methods are often treated synonymously. The term "sol-gel method" as used in the present specification is used to encompass the narrow sense of "sol-gel method", MOD, and CSD unless otherwise stated.

By forming the glass layer 6 from precursors of $TiO_2$ and $ZrO_2$ by buildup using the sol-gel method, the glass layer 6 having few pores and being dense can be formed. Further, by slowly proceeding the sol-gel reaction, formation of voids inside the glass layer 6 can be suppressed. Examples of the method for slowly progressing the sol-gel reaction include using a solvent having a high boiling point as a solvent used for the raw material composition and reducing the rate of temperature rise during the heat treatment.

When the glass layer 6 is formed by the sol-gel method, a raw material composition for forming the glass layer 6 is prepared. The raw material composition may be a liquid material (paste) in which a raw material of the glass (precursor of glass) and an organic polymer are dissolved or dispersed in a solvent.

[Precursor of Glass]

The precursor of glass is a glass raw material and may be any starting material that can produce a glass matrix (glass region 13). As the precursor of glass, in addition to a precursor of $SiO_2$ that is a main skeleton of glass, precursors of $TiO_2$ and $ZrO_2$ are essentially contained, and other precursors can be appropriately mixed. Examples of the precursor of glass include metal alkoxides, acetylacetonate complexes, and acetate salts. These raw materials may be modified with a functional group such as a long-chain alkyl group and an epoxy group. Compounds that can be used as the precursor of glass will be described below.

(Metal Alkoxide)

Examples of an element with which the metal alkoxide can be synthesized include Li, Be, B, C, Na, Mg, Al, Si, P, K, Ca, Sc, Ti, V, Cr, Mn, Fe, Co, Ni, Cu, Zn, Ga, Ge, As, Rb, Sr, Y, Zr, Nb, Mo, Cd, In, Sn, Sb, Cs, Ba, La, Ce, Pr, Nd, Pm, Sm, Eu, Gd, Tb, Dy, Ho, Er, Tm, Yb, Lu, Hf, Ta, W, Hg, Tl, Pb, Bi, Th, Pa, U, and Pu. Alkoxides of these elements can be utilized as precursors of glass.

Specific metal alkoxides that can be used as precursors of glass are exemplified below:

Metal alkoxides such as sodium methoxide, sodium ethoxide, calcium diethoxide, lithium isopropoxide, lithium ethoxide, lithium tert-butoxide, lithium methoxide, boron alkoxides, potassium t-butoxide, tetraethyl orthosilicate, allyltrimethoxysilane, isobutyl(trimethoxy)silane, tetrapropyl orthosilicate, tetramethyl orthosilicate, [3-(diethylamino)propyl]trimethoxysilane, triethoxy(octyl)silane, triethoxyvinylsilane, triethoxyphenylsilane, trimethoxyphenylsilane, trimethoxymethylsilane, butyltrichlorosilane, n-propyltriethoxysilane, methyltrichlorosilane, dimethoxy(methyl)octylsilane, dimethoxydimethylsilane, tris(tert-butoxy)silanol, tris(tert-pentoxy)silanol, hexadecyltrimethoxysilane, dipotassium tris(1,2-benzenediolato-O,O')silicate, tetrabutyl orthosilicate, aluminum silicate, calcium silicate, a tetramethylammonium silicate solution, chlorotriisopropoxytitanium (IV), titanium (IV) isopropoxide, titanium (IV) 2-ethylhexyl oxide, titanium (IV) ethoxide, titanium (IV) butoxide, titanium (IV) tert-butoxide, titanium (IV) propoxide, titanium (IV) methoxide, zirconium (IV) bis(diethyl citrato)dipropoxide, zirconium (IV) dibutoxide(bis-2,4-pentanedionate), zirconium (IV) 2-ethylhexanoate, the zirconium (IV) isopropoxide isopropanol complex, zirconium (IV) ethoxide, zirconium (IV) butoxide, zirconium (IV) tert-butoxide, zirconium (IV)

propoxide, aluminum tert-butoxide, aluminum isopropoxide, aluminum ethoxide, aluminum-tri-sec-butoxide, and aluminum phenoxide.

(Acetylacetonate Complex)

Specific acetylacetonate complexes that can be used as precursors of glass are exemplified below:

Metal complexes of acetylacetonates such as lithium acetylacetonate, titanium (IV) oxyacetylacetonate, titanium diisopropoxide bis(acetylacetonate), zirconium (IV) trifluoroacetylacetonate, zirconium (IV) acetylacetonate, aluminum acetylacetonate, aluminum (III) acetylacetonate, calcium (II) acetylacetonate, and zinc (II) acetylacetonate.

(Acetate Salt)

Specific acetate salts that can be used as precursors of glass are exemplified below:

Acetate salts such as zirconium acetate, zirconium (IV) acetate hydroxide, and basic aluminum acetate.

(Additive for Glass)

The glass contained in the glass layer 6 may contain additives as exemplified below (these are referred to as "additives for glass"). The additives may be mixed in the form of powder, microparticles, or nanoparticles.

Organic acid salts such as salts of oxoacids such as soda ash (sodium carbonate $Na_2CO_3$), sodium hydrogen carbonate ($NaHCO_3$), sodium percarbonate ($2Na_2CO_3 \cdot 3H_2O_2$), sodium sulfite ($Na_2SO_3$), sodium hydrogen sulfite ($NaHSO_3$), sodium sulfate ($Na_2SO_4$), sodium thiosulfate ($Na_2S_2O_3$), sodium nitrate ($NaNO_3$), and sodium sulfite ($NaNO_2$); halogen compounds such as sodium fluoride (NaF), sodium chloride (NaCl), sodium bromide (NaBr), and sodium iodide (NaI); oxides such as sodium peroxide ($Na_2O_2$) and sodium hydroxide (NaOH); inorganic salts such as hydroxides, sodium hydride (NaH), sodium sulfide ($Na_2S$), sodium hydrogen sulfide (NaHS), sodium silicate ($Na_2SiO_3$), trisodium phosphate ($Na_3PO_4$), sodium borate ($Na_3BO_3$), sodium borohydride ($NaBH_4$), sodium cyanide (NaCN), sodium cyanate (NaOCN), and sodium tetrachloroaurate ($Na[AuCl_4]$); sodium acetate ($CH_3COONa$); and sodium citrate.

Inorganic salts such as calcium peroxide ($CaO_2$), calcium hydroxide ($Ca(OH)_2$), calcium fluoride ($CaF_2$), calcium chloride ($CaCl_2 \cdot 2H_2O$), calcium bromide ($CaBr_2 \cdot 2H_2O$), calcium iodide ($CaI_2 \cdot 3H_2O$), calcium hydride ($CaH_2$), calcium carbide ($CaC_2$), and calcium phosphide ($Ca_3P_2$); oxoacid salts such as calcium carbonate ($CaCO_3$), calcium hydrogen carbonate ($Ca(HCO_3)_2$), calcium nitrate ($Ca(NO_3)_2 \cdot 4H_2O$), calcium sulfate ($CaSO_4 \cdot 2H_2O$), calcium sulfite ($CaSO_3$), calcium silicate ($CaSiO_3$ or $Ca_2SiO_4$), calcium phosphate ($Ca_3(PO_4)_2$), calcium pyrophosphate ($Ca_2O_7P_2$), calcium hypochlorite ($Ca[ClO]_2$), calcium chlorate ($Ca(ClO_3)_2$), calcium perchlorate ($Ca(ClO_4)_2$), calcium bromate ($Ca(BrO_3)_2$), calcium iodate ($Ca(IO_3)_2$, $H_2O$), calcium arsenite ($Ca_3(AsO_4)_2$), calcium chromate ($CaCrO_4$), calcium tungstate ($CaWO_4$), calcium molybdate ($CaMoO_4$), calcium magnesium carbonate ($CaMg(CO_3)_2$), and hydroxyapatite ($Ca_5(PO_4)_3(OH)$ or $Ca_{10}(PO_4)_6(OH)_2$); and organic salts such as calcium acetate ($Ca(CH_3COO)_2$), calcium gluconate ($C_{12}H_{22}CaO_{14}$), calcium citrate ($Ca_3(C_6H_5O_7)_2$), calcium malate ($Ca(C_2H_4O(COO)_2$), calcium lactate ($C_6H_{10}CaO_6$), calcium benzoate ($C_{14}H_{10}CaO_4$), calcium stearate ($Ca(C_{17}H_{35}COO)_2$), and calcium aspartate ($Ca(C_4H_6NO_4)_2$).

Lithium carbonate ($Li_2CO_3$), lithium chloride (LiCl), lithium titanate ($Li_2TiO_3$), lithium nitride ($Li_3N$), lithium peroxide ($Li_2O_2$), lithium citrate ($Li_3C_6H_5O_7$), lithium fluoride (LiF), lithium hexafluorophosphate ($LiPF_6$), lithium acetate ($C_2H_3LiO_2$), lithium iodide (LiI), lithium hypochlorite (ClLiO), lithium tetraborate ($Li_2B_4O_7$), lithium bromide (LiBr), lithium nitrate ($LiNO_3$), lithium hydroxide (LiOH), lithium aluminum hydride ($LiAlH_4$), lithium triethylborohydride ($Li(C_2H_5)_3BH$), lithium hydride (LiH), lithium amide ($LiNH_2$), lithium imide ($Li_2NH$), lithium diisopropylamide ($C_6H_{14}LiN$ or $LiN(C_3H_7)_2$), lithium tetramethylpiperidide ($C_9H_{18}LiN$), lithium sulfide ($Li_2S$), lithium sulfate ($Li_2SO_4$), lithium thiophenolate ($C_6H_5LiS$), and lithium phenoxide ($C_6H_5LiO$).

Boron triiodide ($BI_3$), sodium cyanoborohydride ($NaBH_3CN$), sodium borohydride ($NaBH_4$), tetrafluoroboric acid ($HBF_4$), triethylborane (($CH_3CH_2)_3B$), borax ($Na_2B_4O_5(OH)_4 \cdot 8H_2O$), and boric acid ($B(OH)_3$).

Potassium arsenide ($K_3As$), potassium bromide (KBr), potassium carbide ($K_2C_2$), potassium chloride (KCl), potassium fluoride (KF), potassium hydride (KH), potassium iodide (KI), potassium triiodide ($KI_3$), potassium azide ($KN_3$), potassium nitride ($K_3N$), potassium superoxide ($KO_2$), potassium ozonide ($KO_3$), potassium peroxide ($K_2O_2$), potassium phosphide ($K_3P$), potassium sulfide ($K_2S$), potassium selenide ($K_2Se$), potassium telluride ($K_2Te$), potassium tetrafluoroaluminate ($KAlF_4$), potassium tetrafluoroborate ($KBF_4$), potassium tetrahydroborate ($KBH_4$), potassium methanide ($KCH_3$), potassium cyanide (KCN), potassium formate (KHCOO), potassium hydrogen fluoride ($KHF_2$), potassium tetraiodomercurate (II) ($K_2[HgI_4]$), potassium hydrogen sulfide (KHS), potassium octachlorodimolybdate (II) ($K_4[Mo_2Cl_8]$), potassium amide ($KNH_2$), potassium hydroxide (KOH), potassium hexafluorophosphate ($KPF_6$), potassium carbonate ($K_2CO_3$), potassium tetrachloroplatinate (II) ($K_2[PtCl_4]$), potassium hexachloroplatinate (IV) ($K_2[PtCl_6]$), potassium nonahydridorhenate (VII) ($K_2[ReH_9]$), potassium sulfate ($K_2SO_4$), potassium acetate ($CH_3COOK$), gold (I) potassium cyanide ($K[Au(CN)_2]$), potassium hexanitrocobaltate (III) ($K_3[Co(NO_2)_6]$), potassium hexacyanoferrate (III) ($K_3[Fe(CN)_6]$), potassium hexacyanoferrate (II) ($K_4[Fe(CN)_6]$), potassium methoxide ($KOCH_3$), potassium ethoxide ($KOCH_2CH_3$), potassium tert-butoxide ($KOC(CH_3)_3$), potassium cyanate (KOCN), potassium fulminate (KONC), potassium thiocyanate (KSCN), potassium aluminum sulfate ($AlK(SO_4)_2$), potassium aluminate ($KAlO_2$), potassium arsenate ($K_3AsO_4$), potassium bromate ($KBrO_3$), potassium hypochlorite (KClO), potassium chlorite ($KClO_2$), potassium chlorate ($KClO_3$), potassium perchlorate ($KClO_4$), potassium carbonate ($K_2CO_3$), potassium chromate ($K_2CrO_4$), potassium dichromate ($K_2Cr_2O_7$), potassium tetrakis(peroxo)chromate (V) ($K_3Cr(O_2)_4$), potassium cuprate (III) ($KCuO_2$), potassium ferrate ($K_2FeO_4$), potassium iodate ($KIO_3$), potassium periodate ($KIO_4$), potassium permanganate ($KMnO_4$), potassium manganate ($K_2MnO_4$), potassium hypomanganate ($K_3MnO_4$), potassium molybdate ($K_2MoO_4$), potassium nitrite ($KNO_2$), potassium nitrate ($KNO_3$), tripotassium phosphate ($K_3PO_4$), potassium perrhenate ($KReO_4$), potassium selenate ($K_2SeO_4$), potassium silicate ($K_2SiO_3$), potassium sulfite ($K_2SO_3$), potassium sulfate ($K_2SO_4$), potassium thiosulfate ($K_2S_2O_3$), potassium disulfite ($K_2S_2O_5$), potassium dithionate ($K_2S_2O_6$), potassium disulfate ($K_2S_2O_7$), potassium peroxodisulfate ($K_2S_2O_8$), potassium dihydrogen arsenate ($KH_2AsO_4$), dipotassium hydrogen arsenate ($K_2HAsO_4$), potassium hydrogen carbonate ($KHCO_3$), potassium dihydrogen phosphate ($KH_2PO_4$), dipotassium hydrogen phosphate ($K_2HPO_4$), potassium hydrogen selenate ($KHSeO_4$), potassium hydrogen sulfite ($KHSO_3$), potassium hydrogen sulfate ($KHSO_4$), and potassium hydrogen peroxosulfate ($KHSO_5$).

Barium sulfite ($BaSO_3$), barium chloride ($BaCl_2$), barium chlorate ($Ba(ClO_3)_2$), barium perchlorate ($Ba(ClO_4)_2$), barium peroxide ($BaO_2$), barium chromate ($BaCrO_4$), barium acetate ($C_4H_6O_4Ba$), barium cyanide ($Ba(CN)_2$), barium bromide ($BaBr_2$), barium oxalate ($BaC_2O_4$), barium nitrate ($BaN_2O_6$), barium hydroxide ($Ba(OH)_2$), barium hydride ($H_2Ba$), barium carbonate ($BaCO_3$), barium iodide ($BaI_2$), barium sulfide (BaS), and barium sulfate ($BaSO_4$)).

Metal oxides such as sodium oxide ($Na_2O$), calcium oxide (CaO), lithium oxide ($Li_2O$), boron oxide ($B_2O_3$), potassium oxide ($K_2O$), barium oxide (BaO), silicon oxide ($SiO_2$), titanium oxide ($TiO_2$), zirconium oxide ($ZrO_2$), aluminum oxide ($Al_2O_3$), zinc oxide (ZnO), and magnesium oxide (MgO).

[Organic Polymer]

The organic polymer is used to increase the viscosity of the raw material composition to form a paste. Examples of the organic polymer include acrylic (homopolymer or copolymer of acrylic acid, methacrylic acid, or an ester thereof, specifically, an acrylic acid ester copolymer, a methacrylic acid ester copolymer, an acrylic acid ester-methacrylic acid ester copolymer, and the like), polyvinyl acetal-based (specifically, polyvinyl acetal, polyvinyl butyral, and the like), cellulose-based (specifically, hydroxypropyl cellulose, cellulose ether, carboxymethyl cellulose, acetyl cellulose, acetyl nitrocellulose, and the like), polyvinyl alcohol-based, polyvinyl acetate-based, polyvinyl chloride, polypropylene carbonate-based, and polyvinyl pyrrolidone homopolymers or copolymers, and at least one selected from these is contained.

[Solvent]

The solvent is preferably an alcohol-based solvent (specifically, 2-ethylhexanol (185° C.), benzyl alcohol (205° C.), 1,3-butanediol (207° C.), 1,4-butanediol (228° C.), and the like), a ketone-based solvent (specifically, cyclohexanone (156° C.), diacetone alcohol (166° C.), diisobutyl ketone (168° C.), and the like), or a glycol ether-based solvent (specifically, butyl carbitol acetate (247° C.), ethyl carbitol (202° C.), diethylene glycol monoethyl ether (202° C.), diethylene glycol monomethyl ether (194° C.), ethylene glycol monomethyl ether acetate (144° C.), ethylene glycol monoethyl ether (135° C.), ethylene glycol monomethyl ether (124° C.), 2-methoxyethanol (124° C.), propylene glycol monomethyl ether (121° C.), and the like). Since these solvents have high boiling points, it is considered that the sol-gel reaction proceeds slowly, voids are hardly formed inside the glass layer 6, and the titanium dispersion proportion and the zirconium dispersion proportion can be improved.

[Other Components (Reactant and Additive)]

The raw material composition can contain any suitable reactants, additives, and the like in addition to the glass raw materials (and optionally additives for glass) and the solvent. Examples of the reactant for obtaining a compound having a structure represented by the formula —O-M-O— (M is a metal atom) as a main skeleton by reacting a metal alkoxide include water and a hydroxy group-containing compound capable of substituting an alkoxy group of the metal alkoxide with a hydroxy group. Examples of the additive include a catalyst that promotes such a reaction, a viscosity modifier, a pH modifier, and a stabilizer.

Next, such a raw material composition is applied to a predetermined region of the ceramic body 1 and appropriately dried to form a coating film derived from the raw material composition. The coating method is not particularly limited, and immersion, spraying, screen printing, brushing, inkjet printing, or the like can be used. Drying is performed such that most, preferably substantially all, of the solvent in the raw material composition is removed. More specifically, the drying can be performed by heating the ceramic body applied with the raw material composition, for example, at 25 to 200° C. for 5 to 60 minutes.

Next, the ceramic body with the coating film is subjected to a heat treatment to obtain the glass layer 6 derived from the coating film. The temperature and time of the heat treatment can be, for example, 300° C. or higher and 1,100° C. or lower and, for example, 10 to 60 minutes. The temperature of the heat treatment is particularly preferably 400° C. or higher and 1,000° C. or lower.

During this heat treatment (if applicable, during the drying treatment and the heat treatment), the raw material composition gelates to form the glass layer 6 as a sol-gel fired film.

The glass layer 6 thus formed by the sol-gel method becomes a dense glass layer 6 having few pores.

3) Formation of External Electrodes 9 and Plating Layer

The external electrodes are formed on the obtained ceramic body with the glass layer.

The base electrode layers are formed on the surface of the ceramic body with the glass layer. Specifically, the base electrode layers for the external electrodes 9 are formed by various types of thin-film formation methods, various types of printing methods, a dip method, or the like. For example, when the base electrode layers are formed by the dip method, a conductive paste is applied to both end surfaces of the ceramic body, and then the conductive paste is baked. The conductive paste includes an organic solvent, metal particles, and glass. The baking temperature is, for example, 840° C.

Next, plating layers are formed by a plating treatment so as to cover the base electrode layers. The formation of the plating layers constitutes the external electrodes 9.

Electrolytic plating can be performed by immersing the ceramic body provided with the base electrode layers in a plating solution (plating bath) and performing a plating treatment under predetermined conditions. The plating solution to be used and the conditions of the plating treatment can be appropriately selected according to the type of metal to be plated, the thickness of the plating film, and the like.

With this, the electronic component 10 of the present embodiment is manufactured.

Although one embodiment of the present invention has been described above, the present invention is not limited to the embodiment, and various modifications can be made.

Example 1

In the following examples and comparative examples, a ceramic body for a wound inductor is used on the assumption that the electronic component is a wound inductor, but these results similarly apply to other electronic components.

Example 1

Preparation of Ceramic Body 1'

Figure 4:
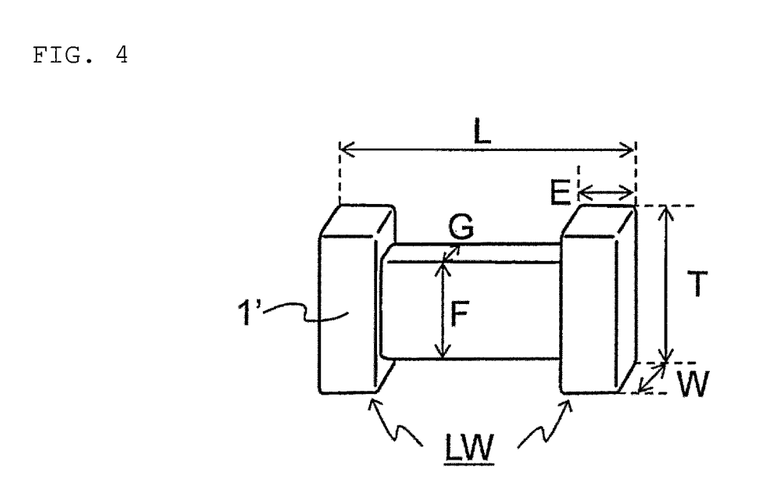
FIG. 4 is a schematic perspective view of a ceramic body in an example of the present invention.

First, a ceramic body 1' for a wound inductor was prepared. The ceramic body 1' was made of a ferrite material and had a shape as schematically illustrated in FIG. 4. The dimensions of this ceramic body 1' were as follows: L=0.70 mm, W=0.30 mm, T=0.50 mm, E=0.30 mm, F=0.32 mm, and G=0.29 mm.

Formation of Glass Layer

A raw material composition (paste) was prepared by mixing the raw materials (components) shown in Table 1 in predetermined masses. The paste contained a Si alkoxide (TEOS: tetraethyl orthosilicate), a Ti alkoxide (TiBu: titanium butoxide), and a Zr alkoxide (ZrPr: zirconia propoxide) as precursors of glass. A 0.01N—HCl solution (0.01N aqueous hydrochloric acid solution) functions as an acid that is a catalyst and water for hydrolysis, and HPC functions as a viscosity modifier and a stabilizer.

Next, the raw material composition was applied to a lower LW surface of the ceramic body 1' (refer to FIG. 4) and the outer periphery thereof, and dried at 150° C. for 30 minutes in an air atmosphere (normal pressure) to form a coating film derived from the raw material composition.

TABLE 1

| Raw material (component) | Blending amount (g) |
|---|---|
| Diethylene glycol monomethyl ether | 13.15 |
| Aluminum (III) acetylacetonate | 0.37 |
| Tetraethyl orthosilicate | 1.53 |
| Titanium (IV) butoxide | 0.24 |
| Zirconium propoxide solution, 70 wt % in 1-propanol | 0.21 |
| 0.01-N normal aqueous hydrochloric acid solution | 0.26 |
| Hydroxypropyl cellulose 2.0-2.9 | 4.24 |
| Total | 20.00 |

Thereafter, the ceramic body 1' with the coating film was subjected to a heat treatment at 815° C. for 30 minutes under an air atmosphere (normal pressure) to form a glass layer derived from the coating film as a sample for measurement.

Examples 2 to 5 and Comparative Examples 1 and 2

A glass layer was formed on the surface of the ceramic body in the same manner as in Example 1 except that the solvent used was changed to a solvent shown in Table 2 (Examples 2 to 5 and Comparative Examples 1 and 2). The results of the titanium dispersion proportion and the zirconium dispersion proportion of each sample are shown in Table 2. Example 1 is also shown in Table 2.

For the samples obtained according to Examples 1 to 5 and Comparative Examples 1 and 2, the plating solution resistance was tested. The results are shown in Table 2.

The plating solution resistance test was performed as follows.
1. A minimum of N=10 samples of glass layers prepared under the same conditions were prepared for each of the examples and comparative examples.
2. The EDX image and the atomic ratio of the surface of the glass layer were acquired by SEM-EDX at a magnification of about 1,000 times with the number of samples N=5.
3. All atom % of the glass component (Si, Ti, Zr, and Al) are added. This was divided by the main component (Fe) of the ceramic body, acquired at N=5, and then the average value was calculated, and this was taken as the initial glass amount.
4. The remaining sample not subjected to SEM-EDX measurement was immersed in a Cu plating solution at 60° C. for 24 hours, washed with water, and dried.
5. Steps 2 and 3 were performed using the sample of Step 4, and the numerical value was defined as the glass amount after immersion.
6. The reduction rate due to immersion in the plating solution was calculated from the glass amounts obtained in Steps 3 and 5.

| Example | Solvent Type | b.p. | Dispersion proportion Ti | Dispersion proportion Zr | Plating solution resistance Reduction rate of glass layer |
|---|---|---|---|---|---|
| Example 1 | Diethylene glycol monomethyl ether | 194° C. | 99.6% | 82.1% | 8% |
| Example 2 | Diethylene glycol monoethyl ether | 202° C. | 99.4% | 82.6% | 13% |
| Example 3 | Diacetone alcohol | 166° C. | 99.4% | 78.8% | 24% |
| Example 4 | 2-Methoxyethanol | 124° C. | 90.8% | 61.7% | 71% |
| Example 5 | Propylene glycol monomethyl ether | 121° C. | 94.4% | 76.1% | 81% |
| Comparative Example 1 | Dispersion proportion | 194° C. | Not mixed | Not mixed | 86% |
| Comparative Example 2 | IPA | 82.5° C. | 38.8% | 29.7% | 92% |

The results in Table 2 are discussed.

In Examples 1 to 5, since the boiling point of the solvent used was high, the dispersion proportions of Ti and Zr in the glass were high, and therefore the reduction rate of the glass layer was low. On the other hand, in Comparative Example 1, since Ti and Zr were not mixed in the glass, the reduction rate of the glass layer was large. In Comparative Example 2, since the boiling point of the solvent used was low, the dispersion proportions of Ti and Zr in the glass were low, and therefore the reduction rate of the glass layer was high.

DESCRIPTION OF REFERENCE SYMBOLS

1: Ceramic body
3: Ceramic portion
5a, 5b: Internal electrode
6: Glass layer
9, 9a, 9b: External electrode
10: Electronic component

The invention claimed is:
1. An electronic component comprising:
a ceramic body;
an external electrode on a first part of a surface of the ceramic body; and
a glass layer covering at least a second part of the surface of the ceramic body,
wherein the glass layer contains silicon atoms, titanium atoms, and zirconium atoms, and
the glass layer has a titanium dispersion proportion of 90% or more and a zirconium dispersion proportion of 60% or more.
2. The electronic component according to claim 1, wherein the titanium dispersion proportion is 95% or more, and the zirconium dispersion proportion is 75% or more.
3. The electronic component according to claim 1, wherein the second part of the surface of the ceramic body covered by the glass layer is not covered by the external electrode.
4. The electronic component according to claim 1, wherein the second part of the surface of the ceramic body covered by the glass layer is also covered by the external electrode.
5. The electronic component according to claim 1, wherein the glass layer further contains a metal.
6. The electronic component according to claim 5, wherein the glass layer has a specific resistance of less than $1.0 \times 10^{-2}$ Ω·cm.

7. The electronic component according to claim 1, wherein the glass layer has a thickness of 0.01 μm to 2 μm.

\* \* \* \* \*